3,559,490
PRESSURE GAUGE
Leonard J. Bohenek, Northampton, Pa., assignor to Ametek, Inc., New York, N.Y., a corporation of Delaware
Filed Apr. 18, 1969, Ser. No. 817,339
Int. Cl. G01l 19/16
U.S. Cl. 73—418    5 Claims

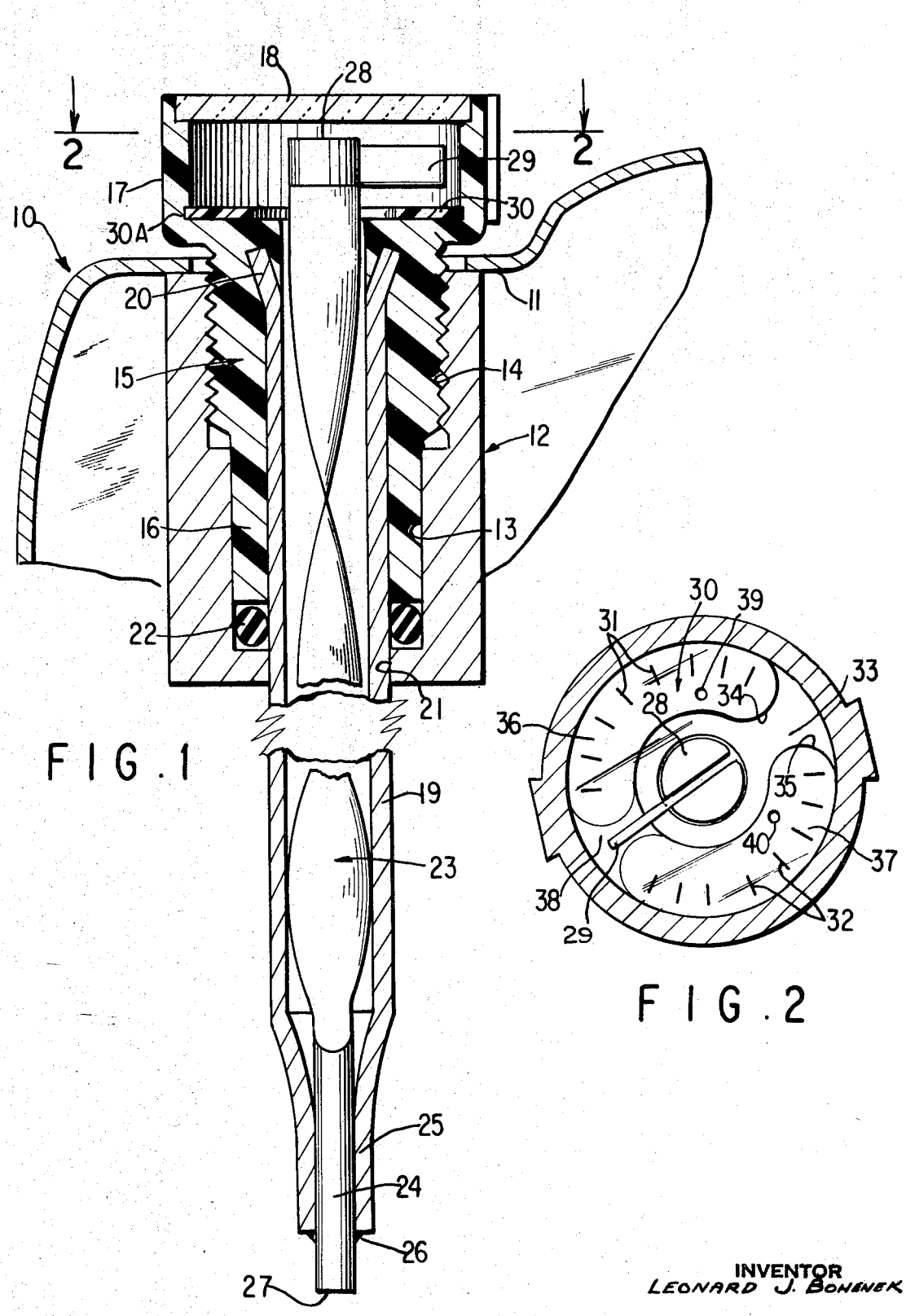

ABSTRACT OF THE DISCLOSURE

A gauge for measuring pressure within a receptacle having an elongated body for mounting on a receptacle wall and extending inside of the receptacle. A calibrated twist tube anchored at its inner end to the elongated body carries an indicator at its outer end which turns with the tube in response to pressure changes in the receptacle. Coacting stationary indicia is provided for viewing at the outer end of the body.

---

This invention relates to pressure gauges and particularly to one suitable for use such as in fire extinguishers.

Pressure gauges employing a twisted tube element for measuring pressure within a closed receptacle or tank are known and such a gauge is disclosed in U.S. Pat. 3,280,632 to Harland et al.

One of the objects of this invention is to simplify the structure of the gauge so as to render the gauge easier to read and therefore more convenient to use.

These and other objects, advantages and features of the invention will become apparent from the following description and drawings which are merely exemplary.

In the drawings:

FIG. 1 is a fragmentary central vertical longitudinal section through a pressure gauge embodying the invention;

FIG. 2 is a horizontal section taken on line 2—2 of FIG. 1.

Referring to the drawing in detail, wherein like numerals designate like parts, numeral 10 indicates a pressurized container for fluid of any type, such as a fire extinguisher, having a wall 11 to which is rigidly secured an internally projecting bushing 12 having a bore 13 with screw threads 14. Within fixed bushing 12 and having screw-threaded engagement therewith is a coupling head or body 15 including a reduced diameter portion 16 extending into the bore 13 of the bushing 12. The coupling head 15 includes an external cylindrical cup-like extension 17 integral therewith and provided at its top with a transparent viewing window 18 formed of any suitable material, such as glass or a suitable plastic.

Arranged coaxially with the coupling head 15 is an elongated tubular body or guard tube 19 having an outer flared end portion 20 embedded in the material of the head 15 and firmly anchored to the head 15. The head 16 may be of a suitable plastic. As shown, tubular body 19 projects substantially below the bushing 12 through an inner end opening 21 to the interior of container or receptacle 10. The tubular body 19 can be surrounded by an O-ring seal 22 within bore 13 at the lower end of extension 16.

Disposed within the body 19 and extending longitudinally therethrough is a twisted pressure responsive tube 23, of the type shown in Pat. No. 3,280,632. Tube 23 is anchored at its lower cylindrical extension 24 to reduced neck 25 of the tubular body by soldering or otherwise joining at 26. The inner or lower end 27 of the pressure responsive tube 23 is open and is in communication with the pressurized interior of receptacle 10. The top end 28 of tube 23 is closed and this end projects centrally into cup extension 17 and carries a radially extending indicating pointer 29 which revolves within cup extension 17 in response to twisting rotation of the tube 23, due to a change in pressure in receptacle 10.

Coacting with the pointer 29 is an annular indicia disc 30 seated on the bottom wall of the cup-like extension 17 in surrounding relationship to the tube 23. In the form shown, the disc 30 has an opening 33 between the rounded ends 34, 35 and one small hole 39 and 40 in each of two indicia segments 36, 37. The opening 33 allows the annulus 30 to be squeezed together by inserting a tool into the holes 39 and 40, set in place and then released. Thus, it will be frictionally held and can be rotated for calibration purposes with the same tool inserted into holes 39 and 40. A slight undercut 30A can be provided to assist in holding the annulus or dial in place. An adhesive or solvent can be similarly used in lieu of an undercut.

Indica segments 36, 37 may be of contrasting or of the same color and can be separated by another contrasting color on portion 38 of the disc. Disc 30 also may have indicia 31 and 32 or any other like indicia which it may be desirable to provide. As pointer 29 turns within the extension 17, it will swing over the indicia or color portions to indicate the pressure in the container. Because of the rounded ends of indicia portions 36, 37, the axis of rotation of the pointer need not be exactly centered.

The pointer and indicia are easily viewable without optical distortion through the lens or window 18.

It should be apparent that variations may be made in details of construction without departing from the spirit of the invention.

What is claimed is:

1. A pressure gauge comprising the combination of a coupling head adapted for connection with a mating coupling part of a pressurized receptacle, said head having a cup-like extension exteriorly of the receptacle, a viewing lens mounted on the top of said extension, a generally ring-like dial having a radial opening therein extending to the central opening thereof to provide spaced apart rounded end portions, said dial including two opposed segmental areas with indicia markings thereon, the inner ends of said segmental areas having opposed arcuate shaped markings to provide a contrastingly shaped area between said segmental areas, said dial being mounted adjacent the bottom of the cup-like extension in spaced relation to the lens, a pressure responsive twist tube projecting into the cup-like extension and being revolvable therein in response to pressure changes, and a radial pointer carried by the twist tube near its upper end and within the interior of the cup-like extension and disposed between said lens and said dial and sweeping around the indicia markings on said dial when the twist tube turns.

2. In a pressure gauge according to claim 1 wherein the lower end of said cup-like extension is recessed to frictionally receive said ring-like dial therein, and means provided in said segmental areas whereby said dial may be rotated therein for calibration.

3. In a pressure gauge according to claim 2 wherein said means included holes in said areas to receive a tool for imparting rotation thereto.

4. In a pressure gauge according to claim 3 wherein the spacing between the rounded end portions of said dial at the radial opening therein permits the segmental areas thereof being squeezed together and the dial rotatably adjusted for calibration.

5. The structure of claim 1, and said twist tube assembly comprising an external tubular body secured fixedly to the coupling head and a pressure responsive twist tube within the tubular body and anchored thereto near the end of the twist tube remote from the radial pointer.

References Cited

UNITED STATES PATENTS

| | | | |
|---|---|---|---|
| 1,676,923 | 7/1928 | Phelan et al. | 73—418 |
| 1,976,938 | 10/1934 | Hedeman | 73—431 |
| 2,152,635 | 4/1939 | Crane et al. | 116—129(A)X |
| 2,317,109 | 4/1943 | Oxland | 116—129(E)X |
| 2,392,057 | 1/1946 | Newmark | 73—418 |
| 2,467,899 | 4/1949 | Lowkrantz | 116—129(A)X |
| 2,925,734 | 2/1960 | Gorgens | 73—418X |
| 3,280,632 | 10/1966 | Harland et al. | 73—418 |

FOREIGN PATENTS

| | | | |
|---|---|---|---|
| 22,373 | 11/1899 | Great Britain | 73—418 |

LOUIS R. PRINCE, Primary Examiner

D. M. YASICH, Assistant Examiner

U.S. Cl. X.R.

73—431; 116—129